(12) United States Patent
Smith

(10) Patent No.: US 6,948,102 B2
(45) Date of Patent: Sep. 20, 2005

(54) PREDICTIVE FAILURE ANALYSIS FOR STORAGE NETWORKS

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/134,960

(22) Filed: Apr. 29, 2002

(65) Prior Publication Data

US 2003/0204788 A1 Oct. 30, 2003

(51) Int. Cl.[7] .................................................. G06F 11/00
(52) U.S. Cl. ............................ 714/47; 714/4; 706/15; 706/21
(58) Field of Search ..................... 714/4, 47; 706/15, 706/21

(56) References Cited

U.S. PATENT DOCUMENTS

| | | | | |
|---|---|---|---|---|
| 5,148,540 A | * | 9/1992 | Beardsley et al. ............. 714/5 |
| 5,253,184 A | * | 10/1993 | Kleinschnitz ................ 702/184 |
| 5,539,592 A | * | 7/1996 | Banks et al. .................. 360/75 |
| 5,761,411 A | * | 6/1998 | Teague et al. ................ 714/47 |
| 5,828,583 A | * | 10/1998 | Bush et al. .................. 702/185 |
| 6,044,411 A | * | 3/2000 | Berglund et al. .............. 710/9 |
| 6,119,112 A | * | 9/2000 | Bush .......................... 706/25 |
| 6,366,985 B1 | * | 4/2002 | Beyerlein et al. ........... 711/147 |
| 6,460,151 B1 | * | 10/2002 | Warwick et al. ............ 714/718 |
| 6,574,754 B1 | * | 6/2003 | Smith .......................... 714/47 |
| 6,598,174 B1 | * | 7/2003 | Parks et al. .................... 714/6 |
| 6,609,212 B1 | * | 8/2003 | Smith .......................... 714/4 |
| 6,771,440 B2 | * | 8/2004 | Smith .......................... 360/31 |

* cited by examiner

Primary Examiner—Robert Beausoliel
Assistant Examiner—Emerson Puente
(74) Attorney, Agent, or Firm—Wood, Herron & Evans, LLP

(57) ABSTRACT

A method of predicting failures of data storage devices in a data storage network. In predicting failures, birth and/or health records of data storage devices in the data storage network are requested. The records are then scaled and thresholded and processed using a probabilistic neural network to classify the data storage devices. Based on the classification, an action is taken to improve the reliability and availability of the data storage network.

31 Claims, 3 Drawing Sheets

PREDICTIVE FAILURE ANALYSIS FOR STORAGE NETWORKS

FIELD OF THE INVENTION

The present invention relates to storage networks. More particularly, to predicting failures in storage networks.

BACKGROUND OF THE INVENTION

Today people rely heavily on computers. Often, computers are networked together to share resources, providing availability of the resource to multiple users, or clients. One resource that is commonly shared is data storage.

Data storage may be provided through a storage network. A storage network may be configured as a storage area network (SAN), a redundant array of independent disks (RAID), network attacked storage (NAS), or some other storage system. A storage network generally includes a variety of data storage devices (e.g., disk drives, optical drives, tape drives, etc.) and components, such as switches, hubs, bridges, storage arrays, etc. for interconnecting the data storage devices that then appear as a single resource to clients.

When one or more of the data storage devices in a storage network fails, resources provide by the storage network may become unavailable to clients or the performance of the resources may be compromised. Unavailability is particularly troublesome when there is such high reliance on data storage.

One approach to maintaining the availability of a storage network is to provide some form of redundancy of data storage devices on the network so that data storage remains available in the event of a device failure. This approach works fine so long as there is only a single failure. However, when multiple failures occur, the performance of the storage network typically suffers, because the redundancy is often only capable of accommodating single failures. Redundancy adds costs due to the need for redundant devices, so supporting redundancy for multiple failures is often a costly proposition.

Another approach is to predict device failures before they occur and undertake some preventative measure. Traditionally, however, failure prediction in a network environment has been difficult to manage, as the prediction functionality has typically been implemented with individual data storage devices. As a result, there has been a tendency at the storage network level to ignore prediction all together and focus on repairing failures after they occur.

Therefore, there continues to be a significant need for predicting the failure of data storage devices installed in a storage network thereby improving the reliability and/or availability of the data storage network.

SUMMARY OF THE INVENTION

The invention addresses these and other problems associated with the prior art by providing a method and apparatus used to characterize data storage devices in a storage network for the purpose of predicting and/or preventing failures of such data storage devices. Status information regarding various data storage devices in a data storage network is requested, and that information is then classified. Based on the classification, an action is taken to improve the reliability and/or availability of the data storage network.

In one embodiment of the invention, the status records are scaled and thresholded and input into a probabilistic neural network. The probabilistic neural network is used to classify the devices.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION

Figure 1:
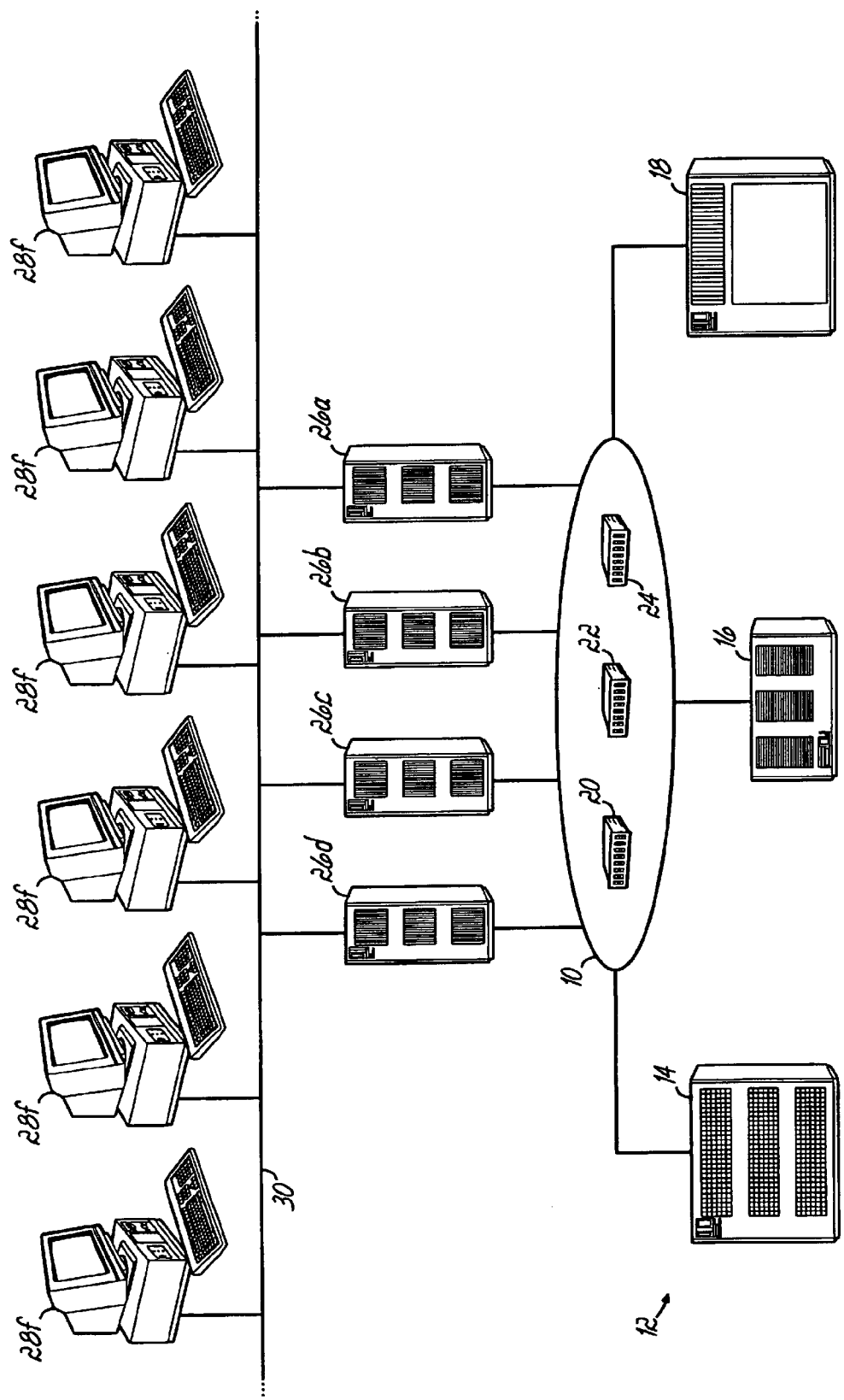
FIG. 1 is an illustration of a networked environment containing a storage area network including a variety of data storage devices embodying features of the present invention.

Referring to FIG. 1, a storage area network (SAN) 10, including a variety of data storage devices 12, embodying features of the present invention is illustrated. The data storage devices 12 may include, but are not limited to, high-end disk arrays 14, just a bunch of disks (JBODs) 16, and tape libraries 18, each including various individual storage media such as magnetic disks, optical disks, magnetic tape, etc. The data storage devices are interconnected using any number and combination of networking components such as hubs 20, switches 22, bridges 24, etc.

SAN 10 is identified by at least one server 26 connected to an infinitely variable number and arrangement of data storage devices 12 through the hubs 20, switches 22 and bridges 24. The servers 26a–d support a plurality of clients 28a–f through a local area network (LAN) 30. Client 28a–f connectivity to the storage devices, 14, 16, 18 is provided through the LAN 30, the servers 26 and the SAN 10.

Three distinct features of the SAN 10 are that: (i.) the storage devices 12 are not directly connected to the clients 26, (ii.) the storage devices 12 are not directly connected to the servers 26 and (iii.) the storage devices 26 are interconnected with each other. Note that, in SAN 10, the storage devices 12 are behind the servers 26.

Although SAN 10 as been used as an example, other storage network configurations may used without departing from the spirit of the present invention. Such other storage network configurations may include a redundant array of independent disks (RAID), network attacked storage (NAS), or some other storage system, as will be appreciated by one of ordinary skill in the art.

Figure 2:
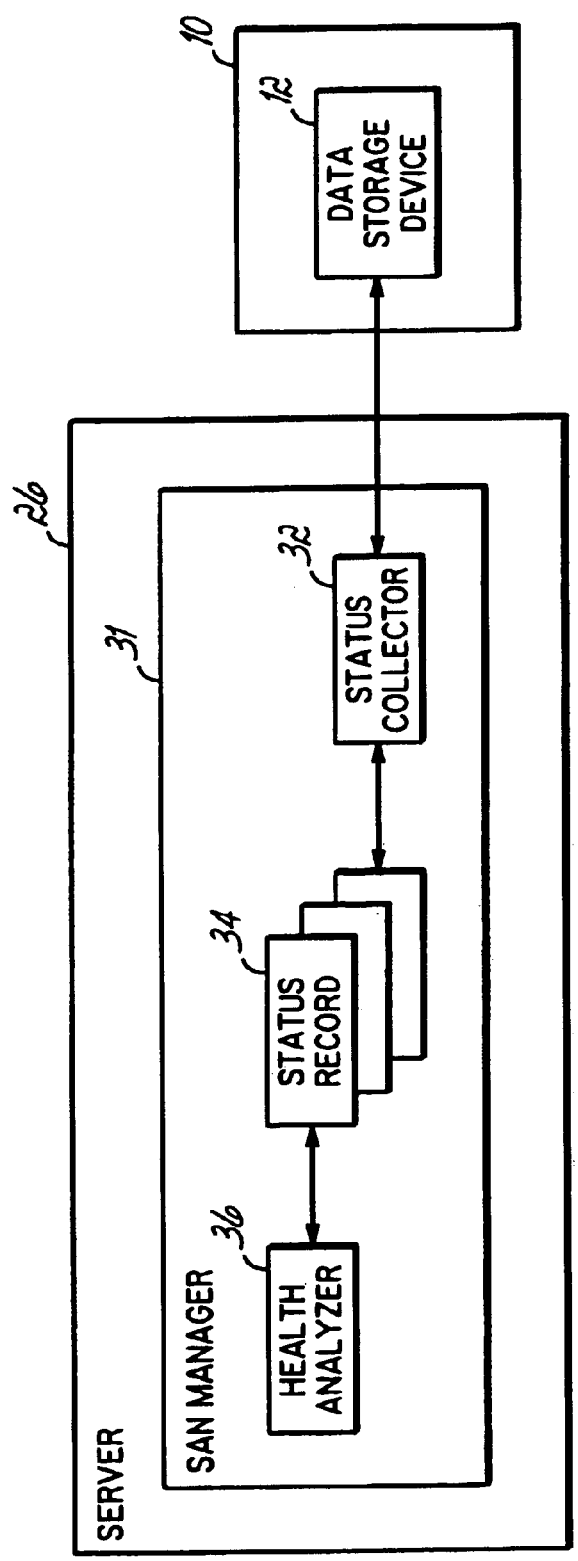
FIG. 2 is a block diagram illustrating the interaction between a server and a data storage device in the storage area network of FIG. 1.

Typical areas of SAN 10 management may include controlling, monitoring and service of the data storage devices 12. For example, FIG. 2 illustrates an exemplary SAN manager program 31, resident in server 26, and used to implement the SAN management functionality discussed herein.

As will be appreciated by one of ordinary skill in the art having the benefit of the instant disclosure, server 26 generally operates under the control of an operating system (not shown), and executes or otherwise relies upon various computer software applications, components, programs, objects, modules, data structures, etc. (e.g., including the aforementioned SAN manager 31). Moreover, various applications, components, programs, objects, modules, etc. may also execute on one or more processors in another computer coupled to server 26 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should-be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the spirit and scope of the invention.

Referring now to FIG. 2, SAN manager 31 comprises, a status collector 32, status information represented by a plurality of status records 34, and a health analyzer 36. Other components, which are not relevant to the functionality discussed herein, are not shown in FIG. 2.

The illustrated components within SAN manager 31 may be used to implement a number of SAN-related functions. One function may be related to monitoring, which is the ability to observe the state of the SAN 10. Another function may relate to information gathering, which refers to the transfer of status information from a data storage device 12 to a server 26 in a SAN 10. Another function relates to organizing status information into status records 34, while another function relates to the processing of the status records 34 to identify potential unhealthiness of devices. Yet another function relates to service, which refers to the activities of finding and resolving problems, diagnosing hardware problems, and performing preventative maintenance.

As illustrated in FIG. 2, status collector 32 within SAN manager 31 is configured to send requests for status information to the various addresses assigned to the various data storage devices 12 in the SAN. One advantage of a SAN 10 is that typically any SAN compatible device 12 can participate in the SAN 10 with minimal difficulty since such a device 12 would be identified by dynamically assigning an address to that device 12. The address then enables the servers 26 to interact with the device 12.

Status information may be in the form of birth and/or health records, or some other type of record or information relating to the status of a data storage device 12 (illustrated in FIG. 2 as status records 34). For example, birth records for a data storage device 12 may provide some or all of the following information: the device type, the manufacturer, the model number, the date and location of manufacture, and/or the serial numbers and error code (EC) levels, e.g. the serial numbers for the card, casting and actuator for a disk drive. Health records for a device 12 may include the current age in power on hours (POH), the microcode/servocode level, the number of starts, e.g. motor start count, the counts of errors, e.g. read/write media server hardware, predicted failure analysis (PFA), and/or temperature, e.g. maximum temperature or time over temperature.

For devices 12 that have previously sent status information, a request may not be made. For example, if a birth record has already been received from a device 12, but the health record is old, a new health record may be requested. Further, if a device 12 is incapable of supplying a requested birth or health record, future requests for these records may not be made. Similarly, if a new device 12 is added to the SAN 10, its birth and health records may be requested at that time. Likewise, if a device 12 is removed from the SAN 10, its status records 34 may be deleted after a specified lapse of time.

Status information may be organized in a server 26 as status records 34 for easy access and processing. In addition, status records 34 may be mirrored, or saved in another location, so that they are always available.

Status records 34 may be organized into tables, lists, structures, etc. One method is to store the records 34 as objects. For example, the birth record containing the date of manufacture (DOM) for a drive "m" in the storage device "n" for a SAN "p" might be referred to as: B.p.n.m.DOM. Similarly, the health records containing the power on hours (POH) for the same device could be referred to as: H.p.n.m.POH. Likewise, the total number of media errors (TME) for the device may be represented as: H.p.n.m.TME.

Table 1 illustrates a variety of birth and health records stored as vectors using the aforementioned technique. A description for each record is included for further illustration.

TABLE 1

| Record | Description |
| --- | --- |
| H.p.n.m.POH(1) | First POH entry in health record for drive m in device n in SAN p |
| H.p.n.m.TME(1) | Total media errors at POH(1) for same drive |
| H.p.n.m.POH(2) | Second POH entry for same drive (POH(1) > POH(2)) |
| H.p.n.mPFA(2) | Number of PFA warnings for the same drive at POH(2) |
| H.p.n.m.MCL(2) | Microcode level at POH(2) for the same drive |

Health analyzer 36 within SAN manager 31 may perform the function of processing the status records 34 containing the status information requested and received from data storage devices 12. The purpose of processing status records 34 is to identify potential unhealthy conditions in devices and develop recommended actions that will improve the reliability and availability of the SAN 10. Health analyzer 36 may be configured to arrange the status records 34 into clusters in a multidimensional space. The clusters then group data storage devices 12 with similar characteristics together. There are several advantages from using clusters in such a manner. First, clustering allows rapid identification of data storage devices 12 in a SAN 10 that need to be closely monitored due to poor health. Second, data storage devices 12 that migrate from one cluster to another may suggest that the health of these devices has improved or degraded.

Health analyzer 36 may perform this processing periodically, at a some set interval, during runtime, or at any other time as desired. Health analyzer 36 typically does not interfere with the availability of data storage when performing this processing.

Figure 3:
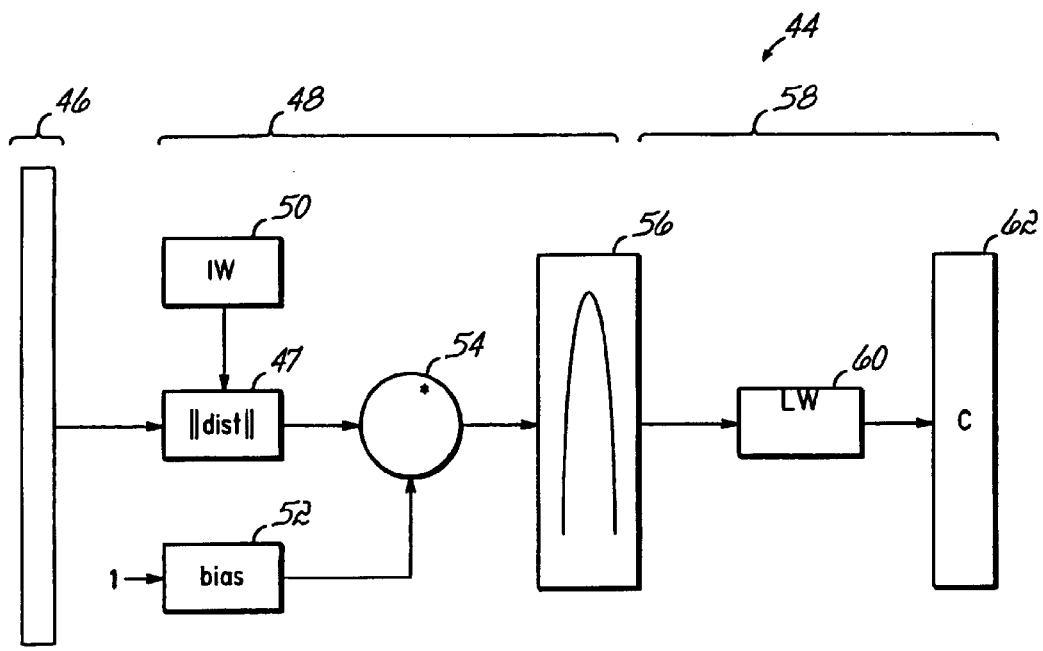
FIG. 3 illustrates an exemplary probabilistic neural network suitable for use in the health analyzer of FIG. 2.

Processing within health analyzer 36 may be accomplished in a variety of ways, as will be appreciated by one of skill in the art. Such processing may include the use of a neural network. Although may different neural networks may used, FIG. 3 illustrates an exemplary probabilistic neural network (PNN) 44.

PNN 44 comprises radial basis and competitive layers 48, 58 to automatically classify status information, such as birth and health records, stored as status records 34. Such status records 34 serve as input vectors 46 in FIG. 3. Initially, the input consists of vectors used to create the PNN 44. Once the PNN 44 is created, the input vectors 46 may consist of birth and health records that have been scaled and thresholded. The definitions of the vectors used for creating the network will be described hereinafter. The input vectors 46 are applied to the radial basis layer 48. In the radial basis layer 48, the distances 47 between input vectors and weights (IW) 50 are multiplied by a bias vector 52 and input to a hidden layer of neurons with a transfer function: $T(n)=EXP(-n^2)$ 54. The output of the radial basis layer 48 is a vector of probabilities for each class of records 56. In the competitive layer 58, a set of weights (LW) 60 are set to a matrix of target vectors. The target vectors describe to what class each input vector or record belongs during training. Each target vector has a 1 in the row associated with that particular class of input and zeros elsewhere. The multiplication of the vector or probabilities 56 from the radial basis layer 48 and LW 60 is sent to the competitive layer 58 that produces a 1 corresponding to the largest element of its input. In this manner, the PNN 44 classifies each status record 34 into a specific class 62 that has the maximum probability of being correct.

As discussed, a PNN 44 is generated based on status information requested from data storage devices 12. Status information, such as birth and health records, may be found in a disk drive error log. Other types of storage devices generally include some form of status information as well. Table 2 contains a portion of the raw output from an exemplary disk drive from an Enterprise Storage Server System available from International Business Machines as an example of the status information available.

TABLE 2

| | |
| --- | --- |
| DRIVE_SN: | ' F80293457K' |
| MICROCODE_REVISION_LEVEL: | ' 0061' |
| MICROCODE_LOAD_PN | ' CUSNA061 ' |
| ROS_SERVO_REVISION_LEVEL: | ' 7341' |
| PLANT_OF_MANUFACTURE: | ' 09RI' |
| DATE_OF_MANUFACTURE: | ' 05/28/00' |
| ASSEMBLY_PN: | ' 34L6475 ' |
| ASSEMBLY_EC: | ' F24491 ' |
| CARD_ASSEMBLY_PN: | ' Q34L5702M07 ' |
| CARD_ASSEMBLY_EC: | ' F25570 ' |
| TOTAL_POH: | 4.7899e+003 |
| MOTOR_START_COUNT: | 242 |
| SEEK_COUNT | 379755000 |
| READ_BYTE_COUNT: | 6.2245e+012 |
| READ_COMMANDS: | 151644615 |
| WRITE_BYTE_COUNT: | 4.8044e+012 |
| WRITE COMMANDS: | 105302400 |
| THERMAL_ASPERITY_COUNT: | 0 |
| REASSIGN_COUNT: | 0 |
| AGRESSIVE_READ_MISSES | 2351249 |
| WRITE_ERRORS: | 0 |
| READ ERRORS: | 3346 |
| VERIFY_ERRORS: | 162 |
| NON_DATA_ERROR_COUNT: | 1 |
| WRITE_INHIBIT_COUNT: | 2712199 |

TABLE 2-continued

```
        SERVO_RECAL_COUNT: 41
        SERVO_ERROR COUNT: 1
    TIME_OVER_TEMP_LIMIT_1: 0
    TIME_OVER_TEMP_LIMIT_2. 0
    MAXIMUM_TEMP_REACHED: 56
       READ_ERRORS_BY_HEAD: [1414 214 561 48 372 93 39 30 241 33 29 15 102 17 67 34 89 36 53
                             21]
         DELTA_FH_ABOVE_CLIP: [0 0 0 0 0 4 0 0 0 0 0 0 42 0 0 0 0 70 0 0]
         DELTA_FH_BELOW_CLIP: [0 0 0 0 0 0 0 0 0 0 0 0 0 0 0 0 0 0 0 0]
```

It may also be desirable to scale and normalize the input 46 of the PNN 44 in connection with clustering status information. One reason for scaling the input 46 is to adjust the inputs so that they are of similar magnitude. Scaling ensures that when calculations are performed in the PNN 44, certain truncation errors do not occur. Normalization is used to make the inputs reasonable representations of the condition of the SAN 10 they represent. For example, rather than use the number of read errors as an input, a ratio relating the number of read errors to the number of bytes read is used. Such a ratio weighs the activity of the data storage devices 12.

Table 3 includes some normalized and scaled parameters from the listing in Table 2.

TABLE 3

| Input Parameter | Object | Scaling | Result |
|---|---|---|---|
| TOTAL_OH | H.x.y.z.POH | 1E-3 | 4.79 |
| CURRENT_DATE - DATE_OF_MANUFACTURE | B.x.y.z.AGE | 1E-2 | 5.82 |
| WRITE_INHIBIT_COUNT/WRITE_COMMANDS | H.x.y.z.WIR | 1E2 | 2.58 |
| SERVO_ERROR_COUNT/SEEK_COUNT | H.x.y.z.ESR | 1E9 | 2.63 |
| READ_ERRORS/READ_BYTE_COUNT | H.x.y.z.RER | 1E10 | 5.38 |
| MOTOR_START_COUNT/TOTAL_POH | H.x.y.z.MSR | 1E2 | 5.05 |
| SUM(MAX(DELTA_FH_ABOVE_CLIP), MAX(DELTA_FH_BELOW_CLIP)) | H.x.y.z.DFH | IE-1 | 7.00 |

The scaling was selected so that all resulting objects have values between 1–10. If a value is greater than 10, the value is set equal to 10. As discussed during the training of the PNN 44, input vectors and target vectors are used to build the PNN 44. The target vector gives a target classification for each input vector. Assuming each input vector contains the parameters listed in Table 1, the input vectors for ten different disk drives like that shown in Table 2 might look like the listing given in Table 4.

TABLE 4

| | | |
|---|---|---|
| DRIVE 1: | {6.33, 5.54, 3.83, 0.00, 8.20, 2.02, 0.01}; | {0, 1, 0} |
| DRIVE 2: | {6.37, 5.53, 2.78, 0.00, 7.99, 2.23, 0.21}; | {0, 1, 0} |
| DRIVE 3: | {6.37, 5.54, 2.74, 0.01, 4.17, 2.23, 0.88}; | {1, 0, 0} |
| DRIVE 4: | {4.83, 5.81, 2.36, 0.02, 1.68, 1.68, 1.40}; | {0, 0, 1} |
| DRIVE 5: | {3.27, 6.47, 3.43, 0.02, 10.0, 2.63, 0.00}; | {1, 0, 0} |
| DRIVE 6: | {3.29, 6.77, 2.75, 0.00, 10.0, 2.28, 1.65}; | {0, 0, 1} |
| DRIVE 7: | {3.29, 6.71, 1.91, 0.00, 2.08, 2.37, 0.49}; | {1, 0, 0} |
| DRIVE 8: | {3.11, 6.71, 2.12, 0.00, 3.18, 1.83, 2.39}; | {0, 0, 1} |
| DRIVE 9: | {3.67, 6.58, 2.34, 0.00, 6.37, 3.92, 0.02}; | {0, 1, 0} |
| DRIVE 10: | {2.99, 6.46, 1.06, 0.00, 0.00, 2.31, 0.01}; | {1, 0, 0} |

For each vector, a scaler identifies the condition of each drive. Using the listing in Table 4, a good condition might be assigned to position 1, poor performance might be assigned to position 2, and a prehead crash might be assigned to position 3. Such an assignment would be interpreted to be that drives 1, 2 and 9 have poor performance, drives 3, 5, 7 and 10 are operating normally, and drives 4, 6 and 8 are likely to experience a head crash.

Figure 4:
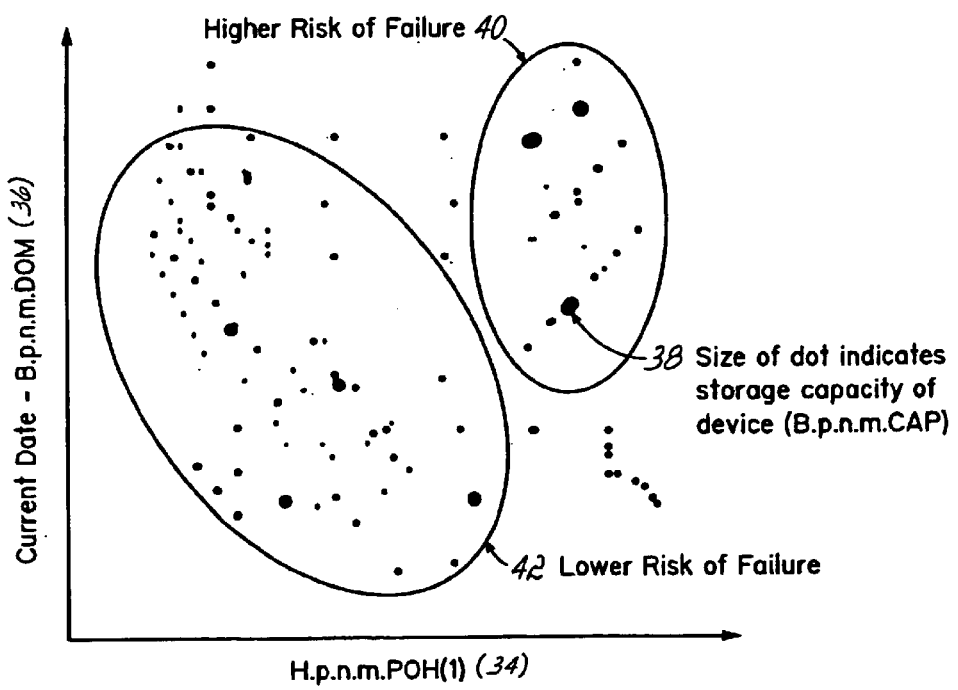
FIG. 4 is a graph illustrating an exemplary classification of birth and health records by the health analyzer of FIG. 2.

Referring now to FIG. 4, a two-dimensional representation of clustering for an exemplary set of data storage devices is illustrated. In FIG. 4, only one health and one birth parameter are used in order to simplify the illustration. Along the horizontal or X axis, the current POH for all like data storage devices 12 is shown. Again, such a vector may be indicated as H.p.n.m.POH(1) 34. Along the vertical or Y axis, the age for these same data storage devices 12 is illustrated. Such information is labeled as B.p.n.m.DOM 36. A point representing the X and Y coordinates for each devices appears in the plot illustrated in FIG. 4. The size of each point represents the data storage device 12 capacity. The device capacity is indicated as B.p.n.m.CAP 38. A clustering program described hereinbefore is able to identify two classes of data storage devices 12, indicated as elliptical class boundaries 40 and 42. One class 40 of data storage devices 12 has a combination of high POH and older age, and therefore, are at a higher risk of failing. Similarly, another class 42 of devices have a combination of lower POH and younger age, and therefore, are at a lower risk of failing.

Although FIG. 4 contains only one health and one birth parameter in order to simplify the illustration, classes typically exist in an n dimensional space, where n is the number of parameters in a record. A probabilistic neural network, such as PNN 44, may be used for such difficult classification problems. An advantage of a probabilistic neural network is that the design is straightforward and is independent of training providing robust generalized classification.

Referring once again to FIG. 3, the result of information processing is a classification 62 for a data storage device 12. Using the classifications from the PNN 44, preventative maintenance actions may be undertaken to enhance the performance and reliability of a SAN 10. Preventative maintenance actions may include increased monitoring, replacement, exchange, notification, etc. One classification may be an unhealthy class. An unhealthy class may include all classes indicative of non-optimal performance and/or susceptiblity to failure.

For example, if a device 12 is classified as operating normally, perhaps no action should be taken. On the other hand, if a device is classified as likely to have a head crash, then the data on the device 12 should be backed up and the device 12 scheduled for replacement. It may also be prudent to replace a device 12 that has poor performance.

As another example, there could be a classification for devices 12 that are performing poorly but need not be replaced. An action that could result for such a device 12 would be to relocate the device so that its poor performance is not important, e.g., to swap the device out with a hot spare, and thus relegate the poor performing device to use as a backup device. The invention is not limited to the classifications discussed hereinbefore, but rather may include many classifications that result in a variety of actions.

It will be appreciated that one of ordinary skill in the art having the benefit of the instant disclosure could implement the disclosed functions in a SAN manager consistent with the invention. Moreover, different implementations of this functionality may be utilized for different storage network environments.

It should be appreciated that predicting the failures of data storage devices installed in a storage network thereby improving the reliability and/or availability of the data storage network may be implemented in the aforementioned manner. Also, status records may be scaled and thresholded and input into a probabilistic neural network to classify the devices. Given the extensibility and flexibility provided by the aforementioned design, an innumerable number of variations may be envisioned.

Various modifications may be made to the illustrated embodiments without departing from the spirit and scope of the invention. Therefore, the invention lies in the claims hereinafter appended.

What is claimed is:

1. A method of monitoring a plurality of data storage devices in a storage network, the method comprising:
    (a) gathering status information from the plurality of data storage devices in the storage network during operation of the storage network, the status information including a plurality of birth records and a plurality of health records associated with the plurality of data storage devices;
    (b) processing the status information to classify at least one data storage device as being unhealthy, wherein processing the status information includes scaling and normalizing the status information from the plurality of birth records and health records and classifying each data storage device into one of a plurality of classes by arranging the scaled and normalized status information from the plurality of birth records and plurality of health records into clusters in a multidimensional space using a probabilistic neural network, and wherein the plurality of classes includes at least three classes representing different relative degrees of health; and,
    (c) performing a preventative maintenance action associated with the unhealthy device in response to such classification.

2. The method of claim 1, wherein gathering status information includes requesting status information from the data storage devices.

3. The method of claim 2, wherein requesting status information comprises making requests only to those data storage devices that have not sent status information.

4. The method of claim 2, wherein requesting status information comprises making requests to those data storage devices whose status information is old.

5. The method of claim 2, wherein requesting status information comprises making requests only to those data storage devices that respond as being capable of supplying requested status information.

6. The method of claim 2, wherein requesting status information comprises making requests when the data storage device is added to the storage network.

7. The method of claim 1, further comprising deleting the status information for a data storage device once the data storage device is removed from the storage network.

8. The method of claim 1, wherein the status information includes at least one of a device type, a date of manufacture, a location of manufacture, a serial number, a current age, a microcode/servocode level, a number of data storage device errors, and a temperature for a device.

9. The method of claim 1, wherein classifying a data storage device as being unhealthy includes detecting a storage device exhibiting symptoms of a prehead crash.

10. The method of claim 1, wherein performing a preventative maintenance action includes at least one of backing up data on the device, scheduling the device for replacement, replacing the device, increasing monitoring, and generating a notification.

11. An apparatus, comprising:
    (a) a memory
    (b) a processor; and,
    (c) program code resident in the memory and configured to be executed by the processor to gather status information from a plurality data storage devices in a storage network during operation of the storage network, process the status information to classify at least one data storage device as being unhealthy, and perform a preventative maintenance action associated with the unhealthy device in response to such classification, wherein the status information includes a plurality of birth records and plurality of health records associated with the plurality of data storage devices, wherein the program code is further configured to scale and normalize the status information from the plurality of birth records and health records and classify each data storage device into one of a plurality of classes by arranging the scaled and normalized status information from the plurality of birth records and plurality of health records into clusters in a multidimensional space using a probabilistic neural network, and wherein the plurality of classes includes at least three classes representing different relative degrees of health.

12. The apparatus of claim 11, wherein the program code is configured to gather status information through requesting status information from the data storage devices.

13. The apparatus of claim 12, wherein the program code is configured to request status information only from those data storage devices that have not sent status information.

14. The apparatus of claim 12, wherein the program code is configured to request status information from those data storage devices whose status information is old.

15. The apparatus of claim 12, wherein the program code is configured to request status information only from those data storage devices that respond as being capable of supplying requested status information.

16. The apparatus of claim 12, wherein the program code is configured to request status information when the data storage device is added to the storage network.

17. The apparatus of claim 11, program code further configured to delete the status information for a data storage device once the data storage device is removed from the storage network.

18. The apparatus of claim 11, wherein the status information includes at least one of a device type, a date of manufacture, a location of manufacture, a serial number, a current age, a microcode/servocode level, a number of data storage device errors, and a temperature for the device.

19. The apparatus of claim 11, wherein the program code is configured to classify a data storage device as being an unhealthy device based upon the data storage device exhibiting symptoms of a prehead crash.

20. The apparatus of claim 11, wherein the preventative maintenance action includes at least one of backing up data on the device, scheduling the device for replacement, replacing the device, increasing monitoring, and generating a notification.

21. A computer system, comprising:
    (a) a storage network including a plurality of data storage devices; and,
    (b) a storage manager configured to gather status information from the plurality data storage devices in the storage network during operation of the storage network, process the status information to classify at least one data storage device as being unhealthy, and perform a preventative maintenance action associated with the unhealthy device in response to such classification, wherein the status information includes a plurality of birth records and a plurality of health records associated with the plurality of data storage devices, wherein the storage manager is further configured to scale and normalize the status information from the plurality of birth records and health records and classify each data storage device into one of a plurality of classes by arranging the scaled and normalized status information from the plurality of birth records and plurality of health records into clusters in a multidimensional space using a probabilistic neural network, and wherein the plurality of classes includes at least three classes representing different relative degrees of health.

22. The computer system of claim 21, wherein the storage manager is configured to gather status information through requesting status information from the data storage devices.

23. The computer system of claim 22, wherein the storage manager is configured to request status information only from those data storage devices that have not sent status information.

24. The computer system of claim 22, wherein the storage manager is configured to request status information from those data storage devices whose status information is old.

25. The computer system of claim 22, wherein the storage manager is configured to request status information only from those data storage devices that respond as being capable of supplying requested status information.

26. The computer system of claim 22, wherein the storage manager is configured to request status information when the data storage device is added to the storage network.

27. The computer system of claim 21, the storage manager is further configured to delete the status information for a data storage device once the data storage device is removed from the storage network.

28. The computer system of claim 21, wherein the status information includes at least one of a device type, a date of manufacture, a location of manufacture, a serial number, a current age, microcode/servocode level, a number of data storage device errors, and a temperature for the device.

29. The computer system of claim 21, wherein the program code is configured to classify a data storage device as being an unhealthy device based upon the data storage device exhibiting symptoms of a prehead crash.

30. The computer system of claim 21, wherein the preventative maintenance action includes at least one of backing up data on the device, scheduling the device for replacement, replacing the device, increasing monitoring, and generating a notification.

31. A program product, comprising:
    (a) program code configured to gather status information from a plurality of data storage devices in a storage network during operation of the storage network, process the status information to classify at least one data storage device as being unhealthy, an perform a preventative maintenance action associated with the unhealthy device in response to such classification, wherein the status information includes plurality of birth records and a plurality of health records associated with the plurality of data storage devices, wherein the program code is further configured to scale and normalize the status information from the plurality of birth records and health records and classify each data storage device into one of a plurality of class by arranging the scaled and normalized status information from the plurality of birth records and plurality of health records into clusters in a multidimensional space using a probabilistic neural network, and wherein the plurality of classes includes at least three classes representing different relative degrees of health; and,
    (b) a computer readable signal bearing medium bearing the program.

* * * * *